Aug. 10, 1954             R. F. TABER             2,685,829

METHOD AND MEANS FOR MAKING CYLINDERS FROM SHEET MATERIAL

Filed April 21, 1951             3 Sheets-Sheet 1

INVENTOR.
RALPH F. TABER

BY

ATTORNEY

Aug. 10, 1954     R. F. TABER     2,685,829
METHOD AND MEANS FOR MAKING CYLINDERS FROM SHEET MATERIAL
Filed April 21, 1951     3 Sheets-Sheet 2
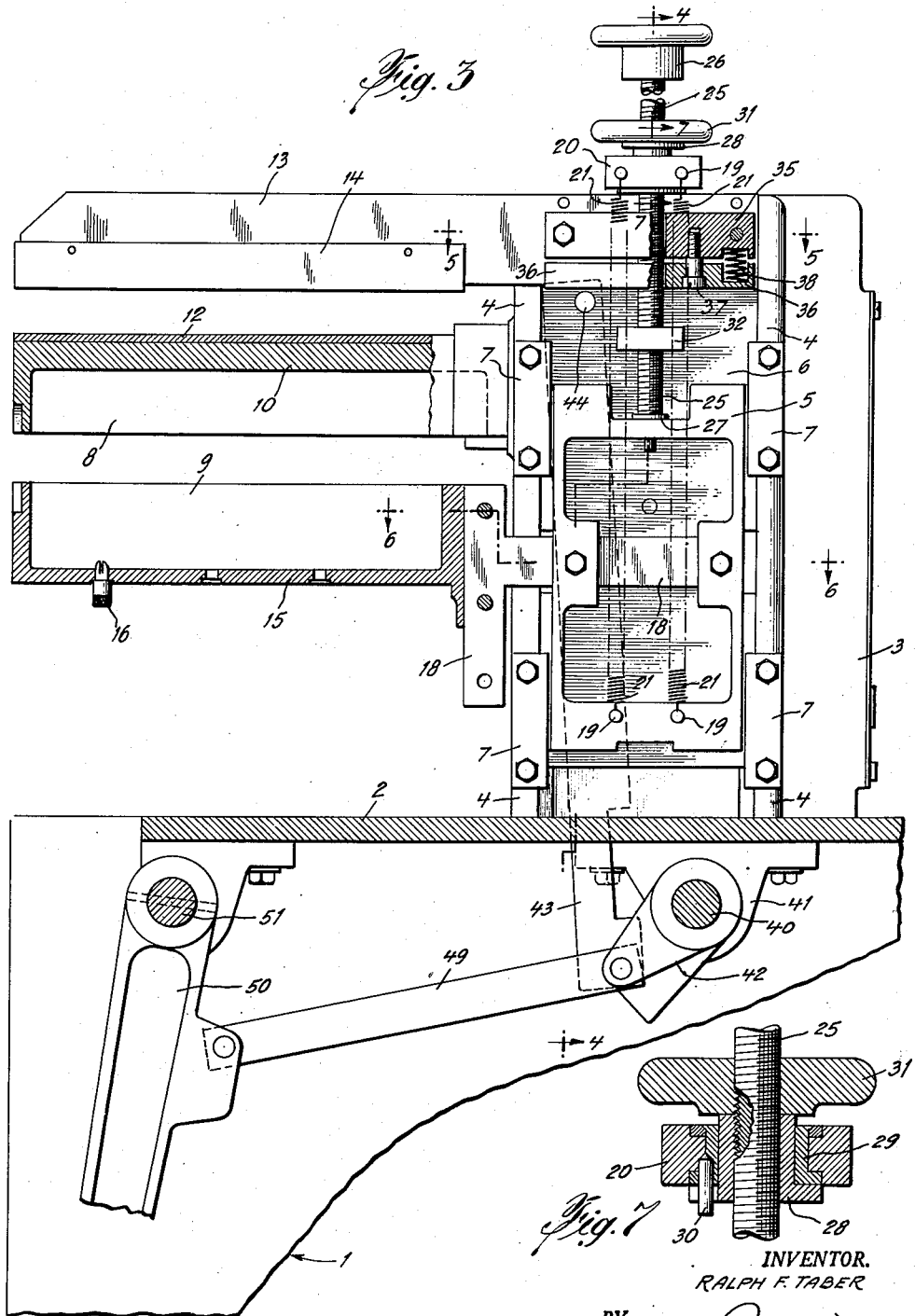
INVENTOR.
RALPH F. TABER
BY
ATTORNEY Aug. 10, 1954　　　R. F. TABER　　　2,685,829
METHOD AND MEANS FOR MAKING CYLINDERS FROM SHEET MATERIAL
Filed April 21, 1951　　　3 Sheets-Sheet 3
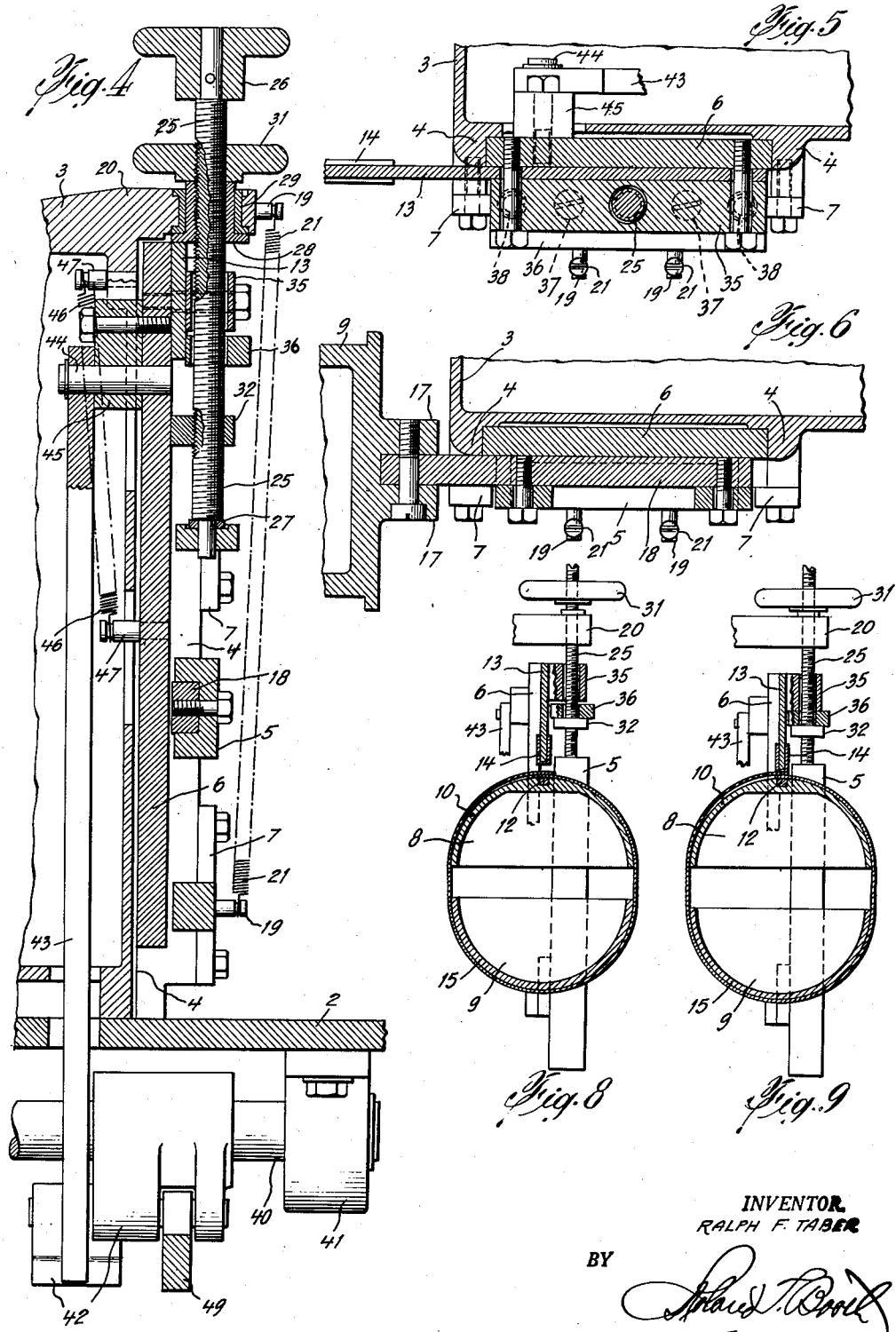
INVENTOR.
RALPH F. TABER
BY
ATTORNEY

Patented Aug. 10, 1954

2,685,829

UNITED STATES PATENT OFFICE 2,685,829

METHOD AND MEANS FOR MAKING CYLINDERS FROM SHEET MATERIAL

Ralph F. Taber, Buffalo, N. Y.

Application April 21, 1951, Serial No. 222,187

11 Claims. (Cl. 93—77)

This invention relates to a machine for making cylinders from sheet material, particularly plastic sheet material.

The invention provides a method for forming or making cylinders from plastic sheet material in which a sheet of plastic material of the desired size has a suitable adhesive applied along one end margin. The sheet material is then formed into tubular relation about an expandable mandrel to overlap the opposite ends with the adhesive portion on one end margin engaging the opposite end margin in the tubular form. This tubular form of the sheet material about the expandable mandrel is formed in a size slightly smaller than the desired finished size of the cylinder after which the overlapped ends of the sheet material are slidably held together while the mandrel is expanded a slight amount to enlarge the tubular form of the sheet into a uniform cylinder of the desired size. The overlapped ends are then united together to permanently seal them to form the desired uniform size cylinder, after which the mandrel is reduced in size with the release of the overlapped secured ends from their held position against the mandrel for easy removal of the completed cylinder from the mandrel. Heat may preferably be applied to the overlapped ends of the sheet material while it is being held against the mandrel to aid in quickly sealing the ends of the cylinder together after it is expanded into the desired uniform size so that the sealing of the ends will be completed as soon as the cylinder has been expanded to the desired size.

It is the purpose of the method provided by this invention to produce a cylinder of uniform size at both ends and throughout the body portion, in which successively produced cylinders will be of the same uniform size so that production at a substantial speed can be obtained at low cost to fit into special beading mechanism for forming beads on the ends of the cylinders in the process of manufacturing containers from plastic sheet material that are of substantially uniform construction.

The invention provides a mandrel constructed for expansion to a limited extent so that a sheet of material may be applied about the mandrel in non-expanded tubular relation with opposite ends overlapped in tubular form about the unexpanded mandrel. Then, a clamp engages and slidably holds the overlapped ends against the mandrel. By expanding the mandrel a predetermined amount, the tubular sheet material has the overlapped ends moved relative to each other a slight amount to enlarge the size of the tube for eliminating non-uniformity and expanding it into a tubular structure of uniform size from end to end. The mandrel structure is formed so that a plurality of cylinders may be successively formed thereon, one at a time, and quickly removed upon return of the mandrel to its non-expanded position for producing uniform sized plastic sheet material cylinders in an economical manner.

According to the invention, a suitable support has a pair of mandrel sections mounted thereon with one section fixed to the support and the other section mounted on a movable slide member. Manually operated mechanism operates a slide plate adjacent the movable slide member to move a pressure bar carried by the slide plate to engage and hold the overlapped ends of a tubular member of sheet material against the mandrel sections while one of the mandrel sections are moved slightly, relative to the other, to enlarge the tubular member held thereon into a uniform size of cylinder.

Control means is provided for fixing the relative movement of the movable mandrel section to the stationary section, for adjusting the size of the cylinders by the position of the mandrel sections relative to each other, and at the same time controlling the adjustment of means for transmitting motion from one slide plate to the other to obtain the desired timing between the operation of the pressure member on the overlapped ends of a cylinder about the mandrel and the enlargement of the mandrel in forming the cylinder into the desired uniform size.

The invention provides for interchanging of the mandrel sections for producing cylinders of any desired size within predetermined limits in which the adjustments for the control of the expansion of the mandrel are arranged for controlling the forming of the cylinders of any size within the limits of the machine.

In the drawings:

Fig. 3 is an enlarged fragmentary side elevation with portions broken away and shown in cross section for convenience in illustrating details of construction.

Fig. 4 is a vertical cross section through the slide plate construction, taken on line 4—4 of Fig. 3.

Fig. 5 is an enlarged horizontal cross section taken on line 5—5 of Fig. 3.

Fig. 6 is an enlarged horizontal cross section, taken on line 6—6 of Fig. 3.

Fig. 7 is an enlarged detailed cross section of part of the control mechanism for controlling the expansion of the mandrel, taken on line 7—7 of Fig. 3.

Fig. 8 is a diagrammatic view showing a cross section through the mandrel and portions of the control mechanism therefor, illustrating how a sheet of material is applied to the mandrel with the ends overlapped in position to be engaged by the pressure bar when the mandrel sections are in non-expanded relation and forming one of the steps in the method of making of a cylinder from plastic sheet material.

Fig. 9 is another diagrammatic view, similar to Fig. 8, showing how the pressure bar engages and slidably holds the overlapped ends of a sheet of plastic material while the mandrel is expanded into the predetermined size for the cylinder and the overlapped ends are secured together. This shows another step in the method of making a cylinder.

Figure 1:
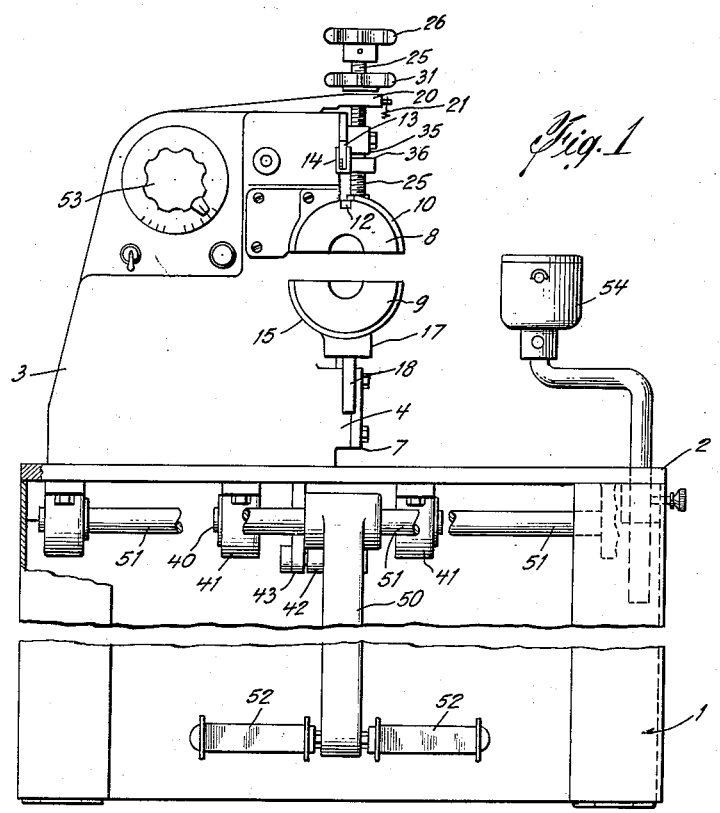
Fig. 1 is a front elevation of the cylinder forming machine according to the invention, with portions broken away and other portions shown in cross section for convenience in illustration.
Figure 2:
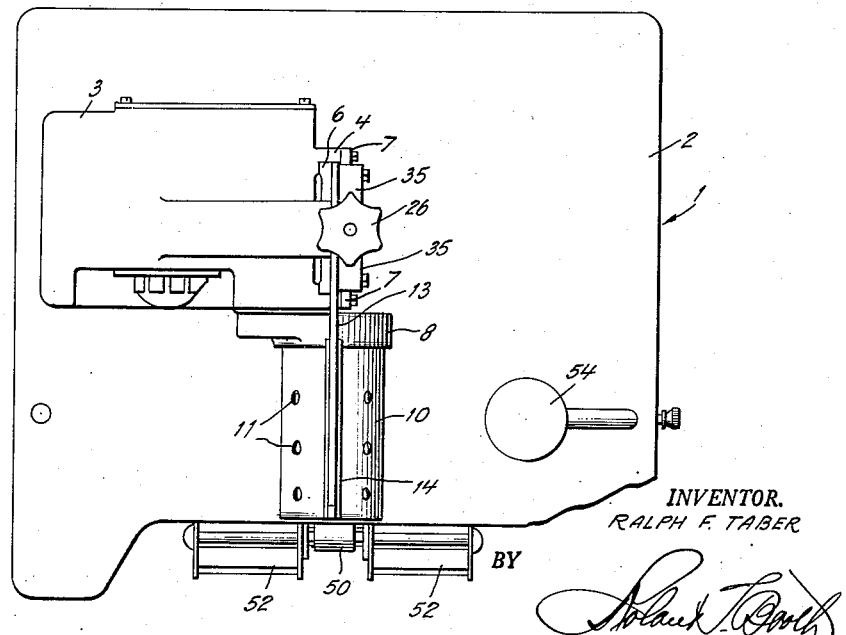
Fig. 2 is a plan view of the cylinder forming machine shown in Fig. 1.

The machine has a base 1 of any desired construction providing end supporting members carrying top 2. A housing 3 is mounted on top 2 at the rear left hand side, as shown in Figs. 1 and 2, to provide a mounting for the mandrel and the slide members with their operating and control mechanism. Housing 3 is provided with guideways 4 for slidably mounting front and rear slide members or plates 5 and 6, respectively. Retaining bars 7 are detachably mounted on the portions of housing 3 over guideways 4 to detachably retain front and rear slide members 5 and 6 in adjacent vertical sliding relation on the housing. Guideways 4 and slide members 5 and 6 are mounted on the side of the housing to the right, as shown in Figs. 1 and 2, and positioned so that the slide members are located in the center portion of top 2.

An expandable mandrel of suitable form receives and forms the plastic sheets into tubular form. The mandrel, as illustrated in the drawings, has a pair of relatively movable sections, including in the form shown, a stationary section 8 and a movable section 9. Stationary mandrel section 8 is detachably mounted on the upper front face of housing 3, as shown in Figs. 1 and 2, with the major portion of the section projecting forwardly from housing 3 and having an outer surface of semi-cylindrical form to provide an arcuate cylinder forming section 10. Section 10 is formed with a plurality of apertures 11 for detachably receiving gage pins to be described. The top central portion of cylinder forming section 10 is formed with a channel for receiving a flat forming bar or anvil 12, having the upper surface thereof flush with adjacent portions of the surface of cylindrical forming section 10. Anvil 12 extends throughout the length of section 10, and is arranged in opposed relation to pressure member or bar 13.

Pressure bar 13 has one end detachably mounted on the upper end of rear slide member 6, as shown in Figs. 3 to 5, while the opposite end projects forwardly in parallel relation to upper or stationary mandrel section 8, with the lower edge in opposed relation to mandrel 12. The lower edge of pressure bar 13 carries a heating element of suitable form mounted and retained on the bar by heater sheath 14 formed with a face at the bottom of pressure bar 13, arranged in parallel relation to the upper surface of anvil or forming bar 12 for cooperation therewith in retaining the overlapped ends of a piece of sheet material between the pressure bar and forming bar in making cylinders of uniform size.

Lower movable mandrel section 9 is formed with a cylinder forming section 15, of substantially semi-cylindrical form, of a size similar to section 10 and arranged in opposed relation thereto for cooperation to provide a substantially cylindrical mandrel. A plurality of apertures are formed in cylinder forming section 15 of lower mandrel 9 for receiving gage pins 16. Gage pins 16 are also adapted for detachable engagement in similar apertures formed in cylinder forming section 10 of upper or stationary mandrel section 8. These gage pins are constructed for manual insertion in the apertures in the mandrel sections so they are frictionally held in position for limiting the position of a sheet being formed on the mandrel.

The rear end of movable mandrel section 9 is formed with spaced parallel flanges 17, see Fig. 6, for engagement on opposite sides of the head on mandrel drive bar 18 having a shank secured to front slide member 5, as shown in Figs. 3, and 6. Lower movable mandrel section 9 is adjustably mounted on the head of mandrel drive bar 18 so it may be placed in two or more predetermined positions depending upon the size of cylinder that it is desired to produce. This adjustment is obtained by having three bolt holes in the head of bar 18 formed in equi-distant relation, as shown in Fig. 3, so that bolts securing mandrel section to bar 18 may be selectively engaged in any pair of bolt holes. Of course, more bolt holes may be provided if greater adjustability is desired.

The shank of mandrel drive bar 18 is mounted in a groove on the rear face of slide member 5, as shown in Figs. 4 and 6, so that when it is bolted in position on member 5 it will be rigidly held for mounting cylinder forming section 15 in parallel relation to section 10 in order to provide a structure that will accurately form sheet material tubes or cylinders of uniform size from end to end. Front slide member or plate 5 has the area intermediate the top and bottom and side margins removed to provide a slide member of open rectangular shape with the central portions formed to provide inwardly extending projections from the side margins where the groove for drive bar 18 is formed so that it may be conveniently attached thereto.

Pins 19 are arranged with a pair mounted in spaced relation on the lower marginal portion of front plate 5 to provide anchors for a pair of springs extending upwardly from the bottom portion of slide member 5, and having the upper portion anchored on a pair of pins 19 mounted on the outer end of top projection 20 formed on the top portion of housing 3 and extending over the upper ends of slide members 5 and 6. Springs 21, as mentioned above, connect the pins 19 on front slide member 5 to the pins on top projection 20, and have sufficient tension to normally move slide member 5 upwardly to its upper limit of movement.

The upper limit of movement of slide member 5 is determined by a control and adjusting mechanism mounted in top projection 20. For this purpose an adjusting screw 25 threaded externally between opposite ends has adjusting knob 26 mounted on a reduced extension on the upper end thereof, while a reduced extension on the lower end extends through a thrust bearing 27, and an aperture in the upper marginal portion of front slide member 5, as shown in Figs. 3 and 4. The upper portion of adjusting screw 25 is threadedly engaged in a cylindrical guide sleeve 28 having a flange on the lower end to engage and limit upward sliding movement of the sleeve in guide bushing 29 rigidly mounted in an aperture extending vertically through top projection 20, see Figs. 4 and 7.

Retaining pin 30, Fig. 7, engages bushing 29 and projection 20 to retain the bushing in position against rotation or movement relative to projection 20. Retaining pin 30 is rigidly mounted in projection 20 and has the lower end projecting through a slot in the end flange on guide sleeve 28 to retain the guide sleeve against rotation so that adjusting screw 25 may be suitably adjusted for lengthwise movement through guide sleeve 28 in adjusting the position of front slide member 5. Cylindrical guide sleeve 28 has a fixed length greater than bushing 29, as shown in Fig. 7, for example, which greater length may be approximately one eighth of an inch or more depending upon the sliding movement that it may be desired to produce in the operation of front slide member 5. A locking knob 31 is threadedly mounted on adjusting screw 25 for engaging the end of cylindrical guide sleeve 28 opposite to that formed with the flange and above the top portion of projection 20, as shown in the drawings, for locking adjusting screw 25 against adjustment in sleeve 28 when the desired adjustment of screw 25 is obtained.

A floating nut 32 is threadedly mounted on adjusting screw 25 above front slide member 5 and below the lower edge of pressure bar 13, as shown in Fig. 3. One edge of floating nut 32 is arranged to slidably engage the outer face of rear slide member 6, as shown in Fig. 4, for preventing rotation of the floating nut relative to the slide members so that it will move up and down relative to the slide members whenever adjusting screw 25 is rotated. In this way the position of floating nut 32 may be adjusted relative to front slide member 5, and the position of both the nut and slide member adjusted relative to guide sleeve 28. This adjustment is obtained by releasing locking knob 31 from engagement with the upper end of sleeve 28 and then manually adjusting knob 26 by rotating adjusting screw 25 to secure the desired adjustment of the slide member and floating nut. The locking knob is then firmly engaged with the end of sleeve 28 to maintain the adjusted position of screw 25. Springs 21 in normally moving front slide member 5 upwardly will maintain the upper central portion engaged with thrust bearing 27 against the lower end of screw 25 and normally move screw 25 and sleeve 28 to its upper limit of movement in which the flange on the lower end of sleeve 28 engages the lower end of guide bushing 29. This will normally retain movable mandrel section 9 in a contracted non-expanded relation with section 8.

A slide operating bar 35 is detachably mounted on the upper end of rear slide member 6 against the outer face of pressure bar 13 and employs the same securing means for securing both the slide operating bar 35 and pressure bar 13 on slide member 6. Slide operating bar 35 is mounted in aligned relation over the upper end of front slide member 5 and is provided with a central bore through which adjusting screw 25 projects, as shown in Figs. 3 and 4. A supplemental slide operating bar 36 cooperates with bar 35 and is mounted immediately below the lower edge of bar 35 on slide pins 37. Bars 35 and 36 have sockets formed in opposite ends thereof in opposed relation to receive compression springs 38, one in each socket, for normally moving supplemental slide bar 36 downwardly away from slide operating bar 35 to the extent limited by slide pins 37. Supplemental slide bar 36 has a central bore aligned with the bore in bar 35 for receiving adjusting screw 25 so that it is arranged in free sliding relation relative thereto. Slide operating bars 35 and 36 are adapted to engage floating nut 32 and move it downwardly to the extent provided by the length of guide sleeve 28 in moving lower mandrel section 9 from the non-expanded to the expanded position during a cylinder forming operation.

Operating mechanism is provided for moving the slide plates in making sheet material cylinders. For this purpose, a suitable crank shaft 40 is rotatably mounted in bearings 41 secured on the under side of top 2. A crank 42 is rigidly mounted on crank shaft 40 and has one end of slide link 43 pivoted thereto while the opposite end extends upwardly through an aperture in top 2, and is pivotally connected at its upper end to slide pin 44. Slide pin 44 engages in slide block 45 and is mounted at the rear of slide member 6, as shown in Fig. 4. Slide block 45 is suitably secured to slide member 6 by bolting or otherwise, and acts to position the upper end of slide link 43 in proper aligned relation with crank 42.

Tension springs 46 have opposite ends anchored on pins 47 mounted in the central portion of slide member 6, and on the top portion of housing 3, as shown in Fig. 4. Springs 46 have sufficient tension to normally move slide member 6 and its connected parts, including slide link 43, crank 42 and other parts of the operating mechanism to the starting or inoperative position in which slide member 6 is at its upper limit of movement, and the mandrel is in non-expanded relation.

Crank 42 has another portion formed to pivotally mount one end of treadle link 49 while the opposite end is pivotally connected to treadle arm 50. Treadle arm 50 has the upper end mounted on treadle shaft 51 carried by the forward edge of top 2 in bearings secured on the under side thereof. The lower end of treadle arm 50 extends downwardly from treadle shaft 51 to a point near the lower end of the base so as to be near the floor on which the machine is supported, where the lower end carries foot pedals 52 extending outwardly from opposite sides of the lower end of the treadle arm.

The treadle, crank, and link mechanism connected with rear slide member 6, has the pivots thereon proportioned and positioned in connection with one another so that when the treadle is manually operated to move from the forwardly extending position, as shown in Figs. 2 and 3, rearwardly, the operation of the foot pedals will move slide member 6 downwardly at a substantially rapid rate to move pressure bar 13 toward upper stationary mandrel 8. As the treadle arm 50 by the manual operation of the foot pedals near its rearward limit of movement, pressure bar 13 will engage sheath 14 with anvil 12 or against the overlapped ends of sheet material placed between the anvil and the pressure bar. The operation is slowed down as the pressure bar moves close to the anvil, according to the position of the crank 42. Just prior to the time when the treadle arm reaches its rearward limit of movement, slide operating bars 35 and 36 will engage floating nut 32 and operate slide member 35 to move the movable mandrel section 9 away from stationary section 8 into the expanded position of the mandrel sections relative to each other.

A suitable electric heating element, not shown, is mounted on pressure bar 13 within sheath 14, and is connected in a well known manner to a suitable source of current supply. Suitable control mechanism for obtaining a desired degree of heat may be provided with a manually adjustable member shown at 53 in Fig. 1, so the operator may set member 53 to secure the desired heat for the end jointing operation. It will be understood that a well known suitable automatic control may be incorporated with the heater structure in the machine at an appropriate point for maintaining a constant and uniform heat of the desired degree under the control and setting of knob 53.

A suitable adhesive or cement containing element is indicated at 54 in Figs. 1 and 2. This adhesive or cement containing member is provided for conveniently applying a desired character of cement to the end margin of a piece of sheet material to be formed into a cylinder.

The method and mechanism provided by this machine is particularly adapted for use in forming plastic sheet material cylinders from flat sheets in the manufacture of plastic boxes from flexible plastic sheet material such as celluloid, acetate, and other similar types of plastic sheet material which may be transparent, semi-transparent, and have any desired color that is available in such materials. The operator selects a piece of sheet material of a size desired for the formation of a suitable size of container and then selects and secures the proper size of mandrel sections on the machine. Adjusting screw 25 is adjusted to secure the proper positioning of slide member 5 and movable mandrel section 9 for the desired size of cylinder. Gage pins 16 are inserted in the desired apertures in mandrel sections 8 and 9. The rear edge of the plastic sheet to be formed is engaged with these gage pins so that the gage pins locate the sheet on the mandrel in the forming operation.

The operator takes the desired piece of sheet material and draws one marginal portion at one end across a suitable wick carried by cement container 54 so that cement is applied to one marginal surface at one end of the sheet. The operator then proceeds to wrap the sheet about mandrel sections 8 and 9 at the front end thereof with the rear edge engaged with gage pins 16. The mandrel sections are in the non-expanded relation and opposite ends of the sheet are overlapped so that the overlapped ends are engaged on anvil 12 with the cement coated portion on one end of the sheet engaging the adjacent face of the margin of the opposite end of the sheet. The overlapped ends of the sheet are manually held over anvil 12.

The operator then moves the treadle arm rearwardly by engaging the pedals which operates the linkage to move slide member 6 downwardly with downward movement of pressure bar 13, to engage heater sheath 14 with the overlapped ends of the sheet material engaged on anvil 12. As treadle arm 50 nears the rearward limit of its movement, pressure bar 13, through sheath 14 engages and slidably holds the overlapped ends of the sheet embracing the mandrel sections against anvil 12 while the heat from the heater through sheath 14 heats the overlapped ends of the sheet material and the cement applied thereto. As this position is reached, supplemental slide operating bar 36 engages floating nut 32 and through the operation of compression springs 38 moves front slide member 5 downwardly to the limit determined by the length of sleeve 28 until locking knob 31 engages the upper end of bushing 29. This moves movable mandrel section 9 with its semi-cylindrical cylinder forming section 15 downwardly to expand the mandrel sections relative to one another. The ends of the sheet slide on one another until the cylinder is expanded to the desired size without stretching the material.

In this expanding operation the sheet embracing the mandrel sections is slightly enlarged and uniformly stretched by the enlargement of mandrel sections through downward movement of the lower mandrel section 9 away from the upper section. This enlarges the cylinder while the overlapped ends are slidably held by pressure bar 13 so that all portions of the sheet material embracing the mandrel sections are enlarged to a uniform tubular size of a desired character. Then, treadle 50 is pushed to its rear limit of movement to firmly move pressure bar 13 against the overlapped ends of the sheet and press them together under pressure. By holding treadle 50 at its rear limit of movement and the mandrel sections in the expanded position for a short space of time the heat from the heater element through sheath 14, will firmly cement and secure the overlapped ends of the sheet together under the pressure excited by bar 13 to unite these ends in cylinder forming relation so that the sheet will be firmly united to form a cylinder of uniform size throughout its length from end to end thereof.

Release of the treadle arm will provide for operation of both slide members 5 and 6 to their upper most positions and the contraction of the mandrel sections by upward movement of movable section 9 to non-expanded position whereupon the cylinder on the mandrel becomes loose and may be readily removed. Sheet material cylinders are made in successive relation by following the method described above in first applying cement to a marginal portion of a sheet, then wrapping it around the mandrel sections in nonexpanded relation, subsequently moving the mandrel sections relative to each other into expanded position while the overlapped ends of the sheet material are slidably held against the mandrel so the cement will unite them firmly together in the expanded position of the mandrel when the cylinder has its size slightly enlarged so as to secure uniformity of size from end to end and provide a cylinder of predetermined size.

It will be understood that many different sizes of mandrel sections may be provided and mounted on the housing and front slide member 5 for cooperation to provide cylinders of different diameter within desired limits. Cylinders of different lengths may be formed on the mandrel sections according to the length of the mandrel sections and particularly the length of the cylinder forming sections thereof in cooperation with the use of gage pins 16 and their position on the cylinder forming sections.

Fig. 8 shows the position of a sheet applied to the mandrel sections in diagrammatic relation with the ends overlapped just prior to the time when pressure bar 13 engages and holds the ends in intimate contacting relation against anvil 12 on upper mandrel section 8. Fig. 9 shows how the movable mandrel section 9 is moved downwardly away from section 8 in parallel relation to enlarge the size of the sheet material cylinder about the mandrel sections from that shown in Fig. 8 to provide a cylinder of uniform size between opposite ends and at the same time firmly press the two ends together so the cement between the adjacent portions for holding these ends in intimate contacting relation will permanently secure the ends of the sheet together in forming a cylinder of uniform size, as described above.

The invention claimed is:

1. A machine for making cylinders from sheet material comprising a cylinder forming mandrel formed of a pair of complementary sections, a support rigidly mounting one section, means on the support mounting the other section for movement toward and from said one section in parallel relation thereto, a pressure member mounted on said support for movement toward and from said one section, means for moving said pressure member toward said one section to engage and hold sheet material against said section, and means operated by the last-mentioned means for moving said other section a predetermined distance away from said one section when said pressure member engages and holds sheet material against said one section, whereby a sheet of material may be placed about said mandrel sections with opposite ends overlapped on said one section in position to be engaged and held by said pressure member while said other section is moved into a position for adjusting said sheet material engaged on said mandrel into a cylinder of predetermined uniform size.

2. A machine for making cylinders from plastic sheet material comprising a mandrel formed of a pair of complementary semi-cylindrical sections, a support having one end of one section rigidly secured thereto, a slide member slidably mounted on said support having one end of the other section secured thereto for limited and parallel movement toward and from said one section, means mounting said other section on said slide member for limited movement relative to said first-mentioned section, a bar mounted at one end on said slide member in parallel opposed relation to said one section on the side opposite said other section, and means for moving said slide member to move said bar toward said one section to engage and hold overlapping ends of a piece of plastic sheet material on said one section and move said other section relative to said slide member for producing cylinders of plastic sheet material of uniform size with the overlapped edges between said one section and bar secured together while held thereby.

3. A machine for making cylinders from plastic sheet material comprising a support having a guideway, a stationary mandrel section rigidly mounted on said support adjacent said guideway, a pair of slide plates slidably mounted in said guideway for slidable movement relative to each other, a movable mandrel section mounted on one of said slide plates in parallel projecting relation to and for cooperation with said stationary mandrel section, a pressure bar mounted on the other slide plate projecting in parallel relation to said stationary mandrel section on the side opposite said movable mandrel section, means normally retaining said first-mentioned slide plate in one position, means for moving said other slide plate in said guideway for engaging said bar with the overlapped ends of a sheet of plastic material embracing said mandrel sections for holding said ends against said stationary mandrel section, and complementary means on said slide plates cooperating to move said one slide plate while said bar holds said overlapped ends of said sheet material for forming said sheet material into a cylinder of uniform size with said overlapped ends united together while held by said bar.

4. A machine for making cylinders from plastic sheet material of the character set forth in claim 3 wherein manually adjustable means is mounted on the support and engages said one slide plate and controls the position of said one slide plate to the other slide plate and also the amount of movement of the movable mandrel section for predetermining the size of a cylinder formed on said mandrels.

5. A machine of the character claimed in claim 3 wherein said complementary means has a rod adjustably supported in a sleeve having limited sliding movement on said support, said rod has one end connected to said one slide plate, an adjustable member on said rod is engaged by a projection portion on said other slide plate, and resilient means normally moves both slide plates in one direction on said support to move said pressure bar away from said stationary mandrel and said movable mandrel toward said stationary mandrel.

6. A machine of the character claimed in claim 3 wherein resilient means normally moves said slide plates in one direction to disengage said pressure bar from said stationary mandrel and moves said movable mandrel toward said stationary mandrel, and a manually operated lever pivoted on said support has linkage means connecting said lever with said other slide plate whereby manual operation of said lever moves said pressure bar, slide plates and movable mandrel in cooperative relation in forming a cylinder.

7. A machine for making cylinders from plastic sheet material comprising a pair of mandrel sections mounted for relative parallel movement in aligned relation toward and from each other, a pressure bar mounted for movement toward and from a clamping position in cooperation with one of said mandrel sections on a portion remote from the other mandrel section, and operating means for moving said bar to engage and hold the overlapped ends of a sheet of plastic material against the remote portion of said one mandrel section and said operating means including relatively movable parts subsequently moving the other mandrel section a predetermined amount to enlarge said mandrel and the cylindrically formed sheet clamped thereon to form a cylinder of desired size.

8. A method of making cylinders from sheet material consisting in engaging a sheet of material about an expandable mandrel in non-expanded relation with opposite ends of the sheet in overlapping contacting relation, engaging and holding the overlapped ends of said sheet in said overlapping contacting relation against said mandrel and subsequently expanding said mandrel to enlarge the size of the cylindrical form of said sheet to a predetermined uniform size, securing the ends of said sheet permanently together, decreasing the size of said mandrel and removing the sheet material cylinder therefrom.

9. The method of making cylinders from sheet material consisting in applying adhesive to a margin of a sheet to be formed, flexing said sheet into tubular form with opposite ends overlapped and engaged with the adhesive between said overlapped ends, firmly holding said ends in overlapped slidably engaged relation with the sheet engaged about an expandable mandrel, expanding said mandrel to slightly enlarge the size of the tubular form of said sheet into a tubular form of predetermined and uniform size, heating said adhesive and securing said overlapped ends permanently together, reducing the size of said mandrel into non-expanded relation, and removing the finished tubular sheet material from the mandrel.

10. A machine for making cylinders from sheet material of the character claimed in claim 2, wherein a member mounted on the slide member has a plurality of attaching elements mounting said movable mandrel part on selected attaching elements in any one of a plurality of positions for providing a plurality of different sizes of mandrel.

11. A machine for making cylinders from sheet material, as claimed in claim 2, having a drive bar mounted at one end on said slide member with the other end projecting outwardly therefrom and formed with a plurality of attaching parts mounting said movable mandrel part in any one of a plurality of positions thereon to form different sizes of mandrels.

References Cited in the file of this patent

UNITED STATES PATENTS

| Number | Name | Date |
| --- | --- | --- |
| 544,721 | Clot | Aug. 20, 1895 |
| 1,802,857 | Willauer | Apr. 28, 1931 |
| 1,838,704 | Potdevin | Dec. 29, 1931 |
| 2,304,824 | Hothersall | Dec. 15, 1942 |